US012235757B2

United States Patent
Kim et al.

(10) Patent No.: US 12,235,757 B2
(45) Date of Patent: Feb. 25, 2025

(54) MEMORY SYSTEMS AND CONTROLLERS FOR GENERATING A COMMAND ADDRESS AND METHODS OF OPERATING SAME

(71) Applicant: Samsung Electronics Co., Ltd., Suwon-si (KR)

(72) Inventors: Sungrae Kim, Suwon-si (KR); Sungyong Cho, Suwon-si (KR); Minho Maeing, Suwon-si (KR); Gilyoung Kang, Suwon-si (KR); Hyeran Kim, Suwon-si (KR); Chisung Oh, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 99 days.

(21) Appl. No.: 18/318,906

(22) Filed: May 17, 2023

(65) Prior Publication Data

US 2023/0376414 A1   Nov. 23, 2023

(30) Foreign Application Priority Data

May 18, 2022   (KR) .................. 10-2022-0061032
Sep. 15, 2022   (KR) .................. 10-2022-0116626

(51) Int. Cl.
*G06F 11/10*   (2006.01)
*G06F 12/06*   (2006.01)

(52) U.S. Cl.
CPC .............. *G06F 12/06* (2013.01); *G06F 11/10* (2013.01)

(58) Field of Classification Search
CPC ................. G06F 11/10; G06F 12/06
USPC ...................................... 714/48, 53
See application file for complete search history.

(56) References Cited

U.S. PATENT DOCUMENTS

| 9,116,828 B2 | 8/2015 | Hollis |
| 9,529,749 B2 | 12/2016 | Hollis |
| 2004/0066213 A1 | 4/2004 | Kwak et al. |
| 2005/0141633 A1 | 6/2005 | Lu |

(Continued)

OTHER PUBLICATIONS

"GDDR6 SGRAM for Networking" Micron Technology, Inc. (May 2020).
Speedster7t Pin Connectivity User Guide (UG084), Achronix Data Acceleration (Apr. 25, 2022).

*Primary Examiner* — Chae M Ko
(74) *Attorney, Agent, or Firm* — Myers Bigel, P.A.

(57) ABSTRACT

A memory system includes a host system having a memory controller therein, which is configured to generate a command address signal. The memory controller includes a first bit signal generator configured to generate a data signal as a plurality of data bits, a second bit signal generator configured to generate a command address bus inversion bit (CABIB) having a high or low logic level that is a function of a number of data bits within the data signal having a predetermined logic level, and a parity bit generator configured to set a parity signal to a first logic level when a total number of data bits within the data signal and the CABIB having a high logic level is an even number. A storage system is also provided, which is configured to write or read data in response to the command address signal received from the host system. The memory controller is configured to set the CABIB to a high logic level when: (i) "n", which is a number of bits included in the command address signal, is a positive integer greater than one, and (ii) a number of data bits within the data signal having a low logic level is greater than or equal to (n/2)−1.

20 Claims, 12 Drawing Sheets

(56) References Cited

U.S. PATENT DOCUMENTS

| | | |
|---|---|---|
| 2007/0038789 A1 | 2/2007 | Macri et al. |
| 2014/0089755 A1 | 3/2014 | Kantamsetti et al. |
| 2016/0085622 A1 | 3/2016 | Andre |
| 2017/0147431 A1* | 5/2017 | West .................. G06F 3/0619 |
| 2019/0310910 A1* | 10/2019 | Kwak ............... H03M 13/1575 |
| 2022/0149866 A1* | 5/2022 | Alzheimer .......... G06F 11/1076 |
| 2023/0062952 A1* | 3/2023 | Jeong .................... G11C 29/52 |
| 2023/0124182 A1* | 4/2023 | Chen .................... G06F 3/0659 |
| | | 365/185.05 |
| 2023/0315564 A1* | 10/2023 | Uribe ................ G06F 11/1016 |
| | | 714/6.2 |
| 2024/0319915 A1* | 9/2024 | Kim .................... G06F 3/0679 |

\* cited by examiner

FIG. 9

| CABI | D0 | D1 | PAR | Total # of 0 |
|---|---|---|---|---|
| L | 0 | 18 | H | 1 |
| L | 1 | 17 | L | 3 |
| L | 2 | 16 | H | 3 |
| L | 3 | 15 | L | 5 |
| L | 4 | 14 | H | 5 |
| L | 5 | 13 | L | 7 |
| L | 6 | 12 | H | 7 |
| L | 7 | 11 | L | 9 |
| L | 8 | 10 | H | 9 |
| H | 9 | 9 | H | 9 |
| H | 8 | 10 | L | 9 |
| H | 7 | 11 | H | 7 |
| H | 6 | 12 | L | 7 |
| H | 5 | 13 | H | 5 |
| H | 4 | 14 | L | 5 |
| H | 3 | 15 | H | 3 |
| H | 2 | 16 | L | 3 |
| H | 1 | 17 | H | 1 |
| H | 0 | 18 | L | 1 |

MEMORY SYSTEMS AND CONTROLLERS FOR GENERATING A COMMAND ADDRESS AND METHODS OF OPERATING SAME

REFERENCE TO PRIORITY APPLICATIONS

This application claims priority under 35 U.S.C. § 119 to Korean Patent Application No. 10-2022-0061032, filed May 18, 2022, and Korean Patent Application No. 10-2022-0116626, filed Sep. 15, 2022, the disclosures of which are hereby incorporated herein by reference.

BACKGROUND

The inventive concept relates to a memory system for generating a command address signal, an operating method of the memory system, and a memory controller, and more particularly, to a memory system that generates a command address signal using a command address bus inversion (CABI) operation and a parity calculation.

A command address signal may include a plurality of bits. Typically, a level of a bit is determined as either a low logic level having a logical value of "0" or a high logic level having a logical value of "1". As the number of bits having a low logic level increase, the power consumed by a memory system may be increased. Alternatively, as the number of bits having a high logic level increase, the power consumed by the memory system may be reduced.

SUMMARY

Recently, memory devices have been developed up to LPDDR5, LPDDR6, and LPDDR7 generations. As performance of memory devices improves, the power consumed by the memory device may also be increased in some instances. Specifically, when a command address signal is generated, as the number of bits having a low logic level increases, the power consumed by a memory system may increase.

According to an embodiment of the inventive concept, a memory system is provided that includes a host system having a memory controller therein, which is configured to generate a command address signal. The memory controller includes a first bit signal generator configured to generate a data signal as a plurality of data bits, a second bit signal generator configured to generate a command address bus inversion bit (CABIB) having a high or low logic level that is a function of a number of data bits within the data signal having a predetermined logic level, and a parity bit generator configured to set a parity signal to a first logic level when a total number of data bits within the data signal and the CABIB having a high logic level is an even number. A storage system is also provided, which is configured to write or read data in response to the command address signal received from the host system. The memory controller is configured to set the CABIB to a high logic level when: (i) "n", which is a number of bits included in the command address signal, is a positive integer greater than one, and (ii) a number of data bits within the data signal having a low logic level is greater than or equal to (n/2)−1.

In some of these embodiments, the memory controller is configured to set a level of the parity signal to a low logic level when the number of data bits within the data signal and the CABIB having a high logic level is an odd number. In some other embodiments, the memory controller is configured to set a level of the parity signal to a high logic level when the number of data bits within the data signal and the CABIB having a high logic level is an even number. The storage system may also include an error detector, which is configured to detect an error within the command address signal. In particular, the error detector may be configured to determine that there is no error in the command address signal when a number of signals having the high logic level within the command address signal is an odd number. The error detector may also be configured to invert the data bits within the data signal when a level of the CABIB is a high logic level.

According to another embodiment, an operating method of a memory system includes generating, by a memory controller of a host system, a command address signal to be transmitted to a memory device, and receiving the command address signal and writing or reading data to or from a storage system based on the command address signal. The generating of the command address signal may include generating a data signal including a plurality of data bits, generating a command address bus inversion bit having one of a high logic level and a low logic level based on a number of signals having the low logic level included in the plurality of data bits, and generating a parity bit for setting a parity signal to a high logic level when a number of signals having the high logic level among signals included in the plurality of data bits and the command address bus inversion bit is an even number.

According to another embodiment, a memory controller, which is included in a memory system and controls an operation of a host system for generating a command address, includes a first bit signal generator configured to generate a data signal including a plurality of data bits, a second bit signal generator configured to generate a command address bus inversion bit having one of a high logic level and a low logic level based on a number of signals having the low logic level included in the plurality of data bits, and a parity bit generator configured to set a parity signal to a high logic level when a number of signals having a high logic level among signals included in the plurality of data bits and the command address bus inversion bit is an even number.

BRIEF DESCRIPTION OF THE DRAWINGS

Embodiments will be more clearly understood from the following detailed description taken in conjunction with the accompanying drawings in which:

FIG. 9 illustrates a state of a command address signal generated by a memory system according to an example embodiment of the inventive concept.

DETAILED DESCRIPTION OF THE EMBODIMENTS

Terms used in the present specification will be briefly described, and embodiments will be described in detail.

Figure 1:
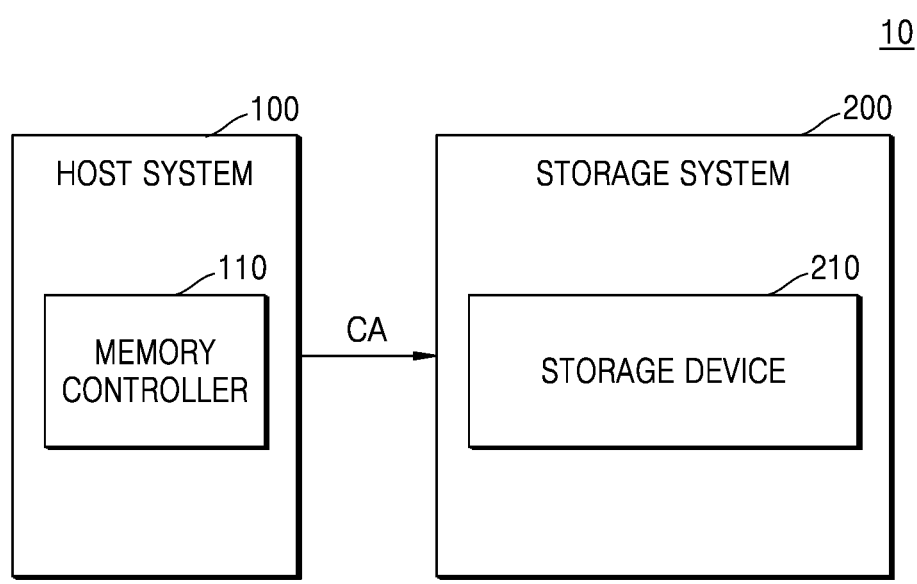
FIG. 1 is a block diagram of a memory system according to an example embodiment of the inventive concept.

FIG. 1 is a block diagram of a memory system 10 according to an example embodiment of the inventive concept. Referring to FIG. 1, the memory system 10 according to an embodiment of the inventive concept includes a host system 100 and a storage system 200 and performs a write operation or a read operation in response to a command address signal of the host system 100. In addition, as described below, the host system 100 includes a memory controller 110, and the storage system 200 includes a storage device 210. The host system 100 may include electronic devices, such as a computer, a notebook computer, a smartphone, a smart pad, a smart television (TV), and a netbook.

In addition, the host system 100 may control the memory system 10 based on an operation of the memory controller 110. A command address signal CA may include commands for normal memory operations, such as writing data and reading data. In addition, according to example embodiments of the inventive concept, the command address signal CA may include a multiple write command requesting that the storage system 200 performs multi-write (or overwrite) of data. In one example, the memory controller 110 may include a multi-write command generator, and the multi-write command generator may generate a multi-write command CMD_MWR.

The memory controller 110 may generate the command address signal CA according to a preset standard of the host system 100 and access the storage device 210. The memory controller 110 may communicate with a host by using various protocols and may use an interface protocol, such as peripheral component interconnect-express (PCIe), advanced technology attachment (ATA), serial ATA (SATA), parallel ATA (PATA), or serial attached small computer system interface (SCSI) (SAS), to communicate with the host. In addition, various other interface protocols, such as a Universal Serial Bus (USB), a multi-media card (MMC), an enhanced small disk interface (ESDI), and integrated drive electronics (IDE), may be applied to a protocol between the host system 100 and the memory controller 110.

The storage system 200 receives the command address signal CA from the host system 100 and performs a write operation or a read operation in response to the received command address signal CA. Here, the storage system 200 may include at least one storage device 210. The storage device 210 according to the embodiment may include dynamic random access memory (DRAM), such as double data rate synchronous dynamic random access memory (DDR SDRAM), low power DDR (LPDDR) SDRAM, Graphics DDR (GDDR) SDRAM, and Rambus dynamic random access memory (RDRAM). However, embodiments of the inventive concept are not limited thereto, and in one example, the storage device 210 may include non-volatile memory, such as flash memory, magnetic RAM (MRAM), ferroelectric RAM (FeRAM or FRAM), phase change RAM (PRAM), and resistive RAM (ReRAM or RRAM).

Here, the storage device 210 may include a plurality of banks including a plurality of memory cells connected to a plurality of word lines and a plurality of bit lines, and a plurality of redundancy memory cells connected to at least one redundancy word line and bit lines. According to an embodiment, the storage device 210 may include a plurality of banks including a plurality of memory cells connected to a plurality of word lines and a plurality of bit lines, and a plurality of redundancy memory cells connected to word lines and at least one bit line.

Figure 2:
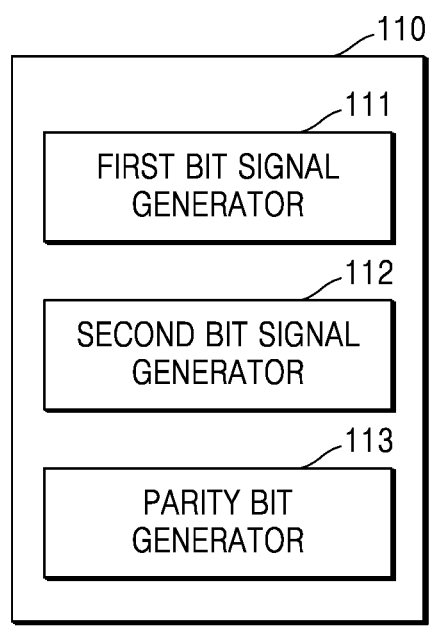
FIG. 2 is a block diagram of a memory controller according to an example embodiment of the inventive concept.

FIG. 2 is a block diagram of the memory controller 110 according to an example embodiment of the inventive concept. Referring to FIG. 2, the memory controller 110 may include a first bit generator 111 that generates data bits, a second bit generator 112 that generates a command address bus inversion bit (CABIB), and a parity bit generator 113. The first bit generator 111 generates data bits. The data bit refers to a data bit including information to be transferred to the storage system 200 by the host system 100. Here, a plurality of data bits may be generated. For example, when the number of bits included in the command address signal CA is n, n−2 data bits may be generated. For example, when the total number of bits included in the command address signal CA is 20, the number of data bits may be 18. In addition, each of the data bits may have a state of either a low logic level or a high logic level. Here, the low logic level indicates a state in which a logical value of the data bit is "0", and the high logic level indicates a state in which the logical value of the data bit is "1".

The second bit generator 112 generates a command address bus inversion bit. The command address bus inversion bit indicates is included in the command address CA to reduce power consumed by the memory system 10. Here, a state of the command address bus inversion bit may be determined based on the number of bits having a low logic level in data bits. For example, when the number of bits included in the command address signal CA is n and the number of bits at a low logic level among the bits included in the data bits is greater than or equal to (n/2)−1, a state of the command address bus inversion bit may be set to a high logic level. In addition, when the number of bits included in the command address signal CA is n and the number of bits at a low logic level among the bits included in the data bits is less than (n/2)−1, the state of the command address bus inversion bit may be set to a low logic level. When the state of the command address bus inversion bit is set to a high logic level, the number of bits at a low logic level among bits included in the command address signal CA is reduced to be less than or equal to a half of the total number of the bits included in the command address signal CA, and thus, power consumed by the memory system 10 may be reduced.

In addition, the second bit generator 112 may generate a first signal by combining the data bit with the command address bus inversion bit. A parity bit may be generated based on the first signal. A process of generating a parity signal will be described in detail with reference to FIG. 5.

The parity bit generator 113 may generate a parity bit based on the data bit and the command address bus inversion bit. The parity bit indicates a bit added to check whether an error occurs during transmission of the command address signal CA. A state of the parity bit may be set such that the number of signals having a high logic level among bits included in the command address signal CA is an odd number. For example, when the number of signals having a high logic level among signals included in data bits and a command address bus inversion bit is an odd number, the parity bit generator 113 may set a level of a parity signal to a low logic level. In addition, when the number of signals having a high logic level among the signals included in the data bits and the command address bus inversion bit is an even number, the parity bit generator 113 may set the level of a parity signal to a high logic level.

When signals having a high logic level among bits included in the command address signal CA are set to an odd number, the command address signal CA is configured such the number of bits having a high logic level is greater than the number of bits having a low logic level among the bits included in the command address signal CA. When the command address signal CA is configured such the number of bits having a high logic level is greater than the number of bits having a low logic level among the bits included in the command address signal CA, there is an effect that power consumed by the memory system 10 is reduced.

Figure 3:
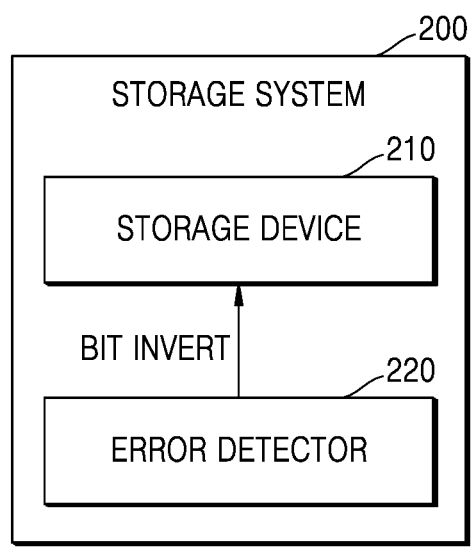
FIG. 3 is a block diagram of a storage system according to an example embodiment of the inventive concept.

FIG. 3 is a block diagram of the storage system 200 according to an example embodiment of the inventive concept. Referring to FIG. 3, the storage system 200 according to the present embodiment may include a storage device 210 and an error detector 220, and the error detector 220 determines whether there is an error in the command address signal CA and may perform a bit inverting operation on data bits.

As described above, the storage device 210 according to the embodiment may include DRAM, such as DDR SDRAM, LPDDR SDRAM, GDDR SDRAM, and RDRAM. However, embodiments of the inventive concept are not limited thereto, and in one example, the storage device 210 may include non-volatile memory, such as flash memory, MRAM, FeRAM, PRAM, and ReRAM.

The error detector 220 may detect an error in the command address signal CA received by the storage system 200. For example, when the number of high logic level signals included in the command address signal CA is an odd number, the error detector 220 determines that the command address signal CA has no errors and performs a write operation or a read operation according to information of the command address signal CA. Here, when a level of the command address bus inversion bit included in the command address signal CA is a high logic level, the error detector 220 inverts data bits and transmits the command address signal CA to the storage device 210. Then, once the data bits are inverted, the command address signal CA is configured such that the number of bits having a logical value of "1" is greater than the number of bits having a logical value of "0". When the command address signal CA is configured such that the number of bits having a logical value of "1" is greater than the number of bits having a logical value of "0", there is an effect that power consumed by the memory system 10 is reduced. In contrast, when the number of signals at a high logic level included in the command address signal CA is an even number, the error detector 220 determines that there is an error in the command address signal CA and may not perform a write operation or a read operation according to information of the command address signal CA.

Figure 4:
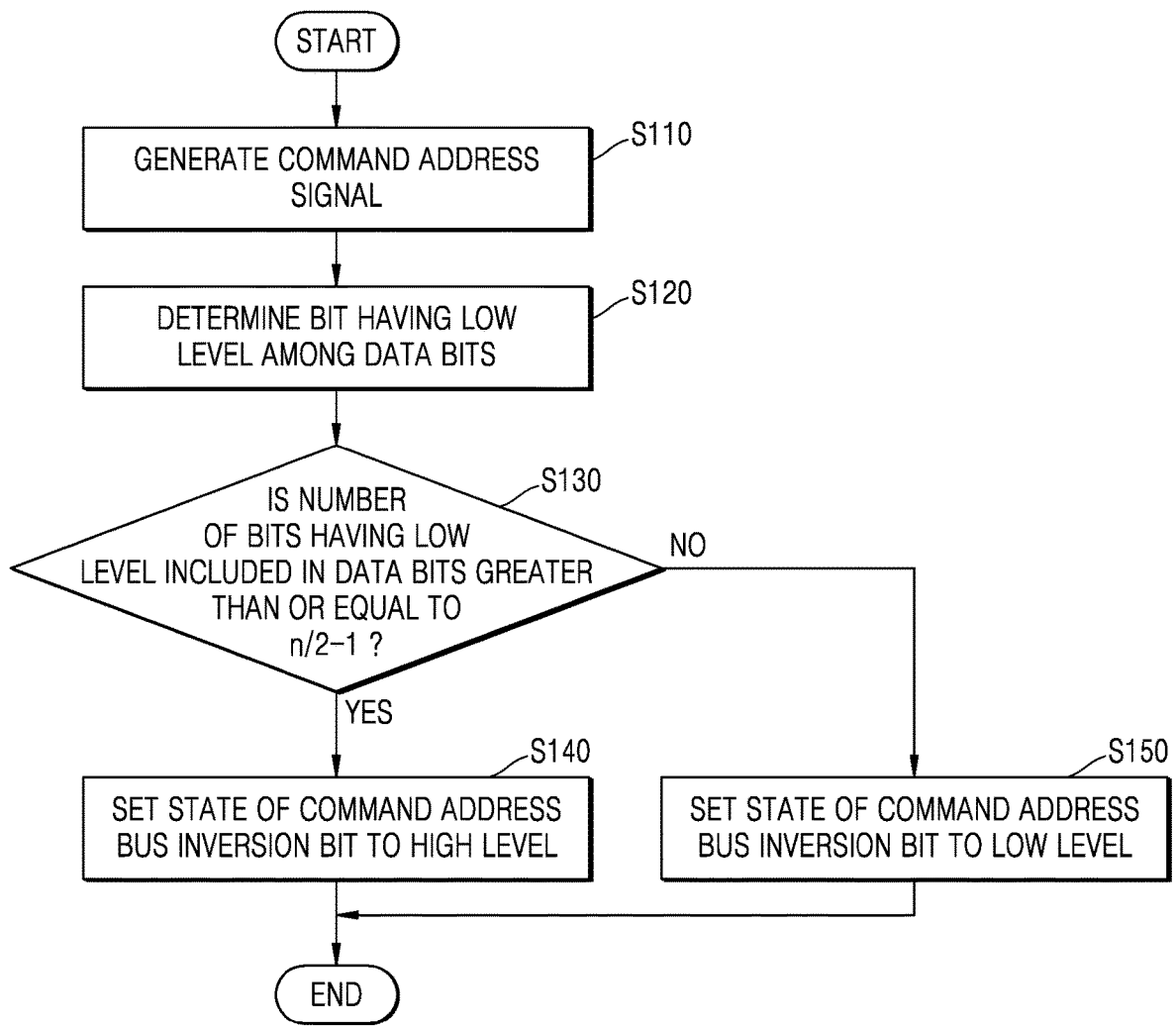
FIG. 4 is a flowchart of an operating method of a memory system, according to an example embodiment of the inventive concept.

FIG. 4 is a flowchart of an operating method of the memory system 10, according to an example embodiment of the inventive concept. Referring to FIG. 4, the operating method of the memory system 10, according to the present embodiment, starts from generating the command address signal CA by using the host system 100 (S110). When the command address signal CA is generated, the memory controller 110 may determine bits having a low logic level among data bits included in the command address signal CA (S120). That is, the memory controller 110 may determine bits having a logical value of "0" among the data bits included in the command address signal CA. When the bits having a low logic level are determined among the data bits included in the command address signal CA, the memory controller 110 may determine whether the number of bits having a low logic level among the bits included in the data bits is greater than or equal to (n/2)-1. Here, n indicates the total number of bits included in the command address signal CA, and the number of data bits included in the command address signal CA may be n-2 in total.

When it is determined that the number of bits having a low logic level among the bits included in the data bits is greater than or equal to (n/2)-1 (YES in S130), the memory controller 110 may set a state of a command address bus inversion bit to a high logic level (S140). When the state of the command address bus inversion bit is set to a high logic level, the number of bits having a low logic level in the command address signal CA may be reduced, and thus, power consumed by the memory system 10 may be reduced. However, when it is determined that the number of bits having a low logic level among the bits included in the data bits is less than (n/2)-1 (NO in S130), the memory controller 110 may set a state of command address bus inversion to a low logic level (S150).

Figure 5:
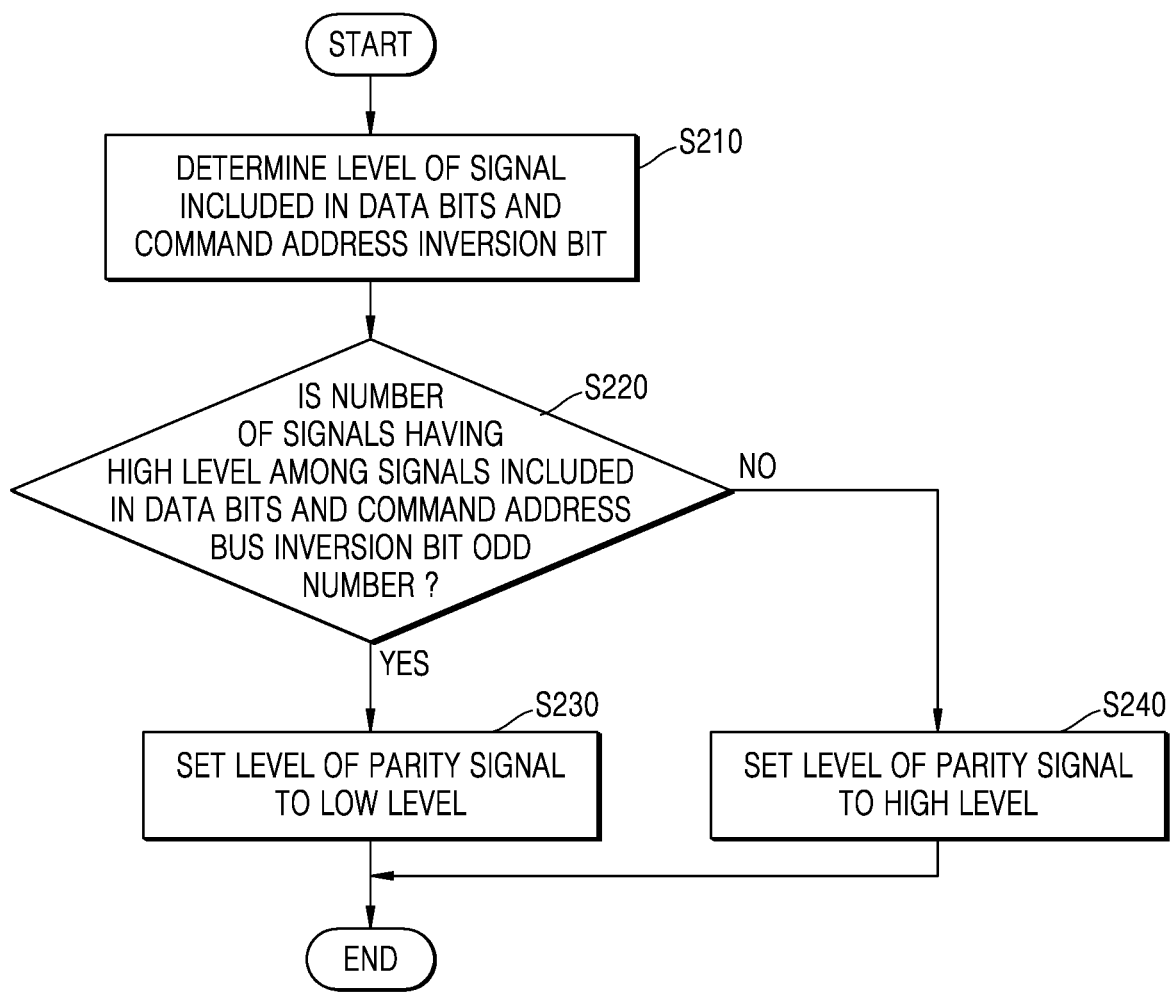
FIG. 5 is a flowchart illustrating a process of determining a parity bit by a memory system, according to an example embodiment of the inventive concept.

FIG. 5 is a flowchart illustrating a process of determining a parity bit by the memory system 10, according to an example embodiment of the inventive concept. Referring to FIG. 5, the memory controller 110 according to the present embodiment may determine levels of signals included in data bits and a command address bus inversion bit (S210). Here, a signal obtained by combining the data bits with the command address bus inversion bit may be referred to as a first signal. In addition, determining the level of a signal may include determining whether bits included in the first signal have a low logic level or a high logic level.

For example, the memory controller 110 may determine whether the number of signals having a high logic level among signals included in the data bits and the command address bus inversion bit is an odd number (S220). When it is determined that the number of signals having a high logic level among the signals included in the data bits and the command address bus inversion bit is an odd number (YES in S220), the memory controller 110 may set a level of a parity signal to a low logic level. (S230). When the number of signals having a high logic level among the signals included in the data bits and the command address bus inversion bit is an odd number and the parity bit is set to a low logic level, the number of bits having a low logic level in the command address signal CA may be maintained as an odd number, and accordingly, the number of bits having a low logic level in the command address signal CA may be maintained to be less than or equal to 2/n. Here, n indicates the number of bits included in the command address signal CA.

However, when it is determined that the number of signals having a high logic level among the signals included in the data bits and the command address bus inversion bit is not an odd number (NO in S220), the memory controller 110 may set the level of the parity signal to a high logic level (S240). When the number of signals having a high logic level among the signals included in the data bits and the command address bus inversion bit is not an odd number and the parity bit is set to a high logic level, the memory controller 110 may maintain the number of bits having a low logic level in the command address signal CA as an odd number, and accordingly, the number of bits having a low logic level in the command address signal CA may be maintained to be less than or equal to 2/n. Here, n indicates the number of bits included in the command address signal CA.

Figure 6:
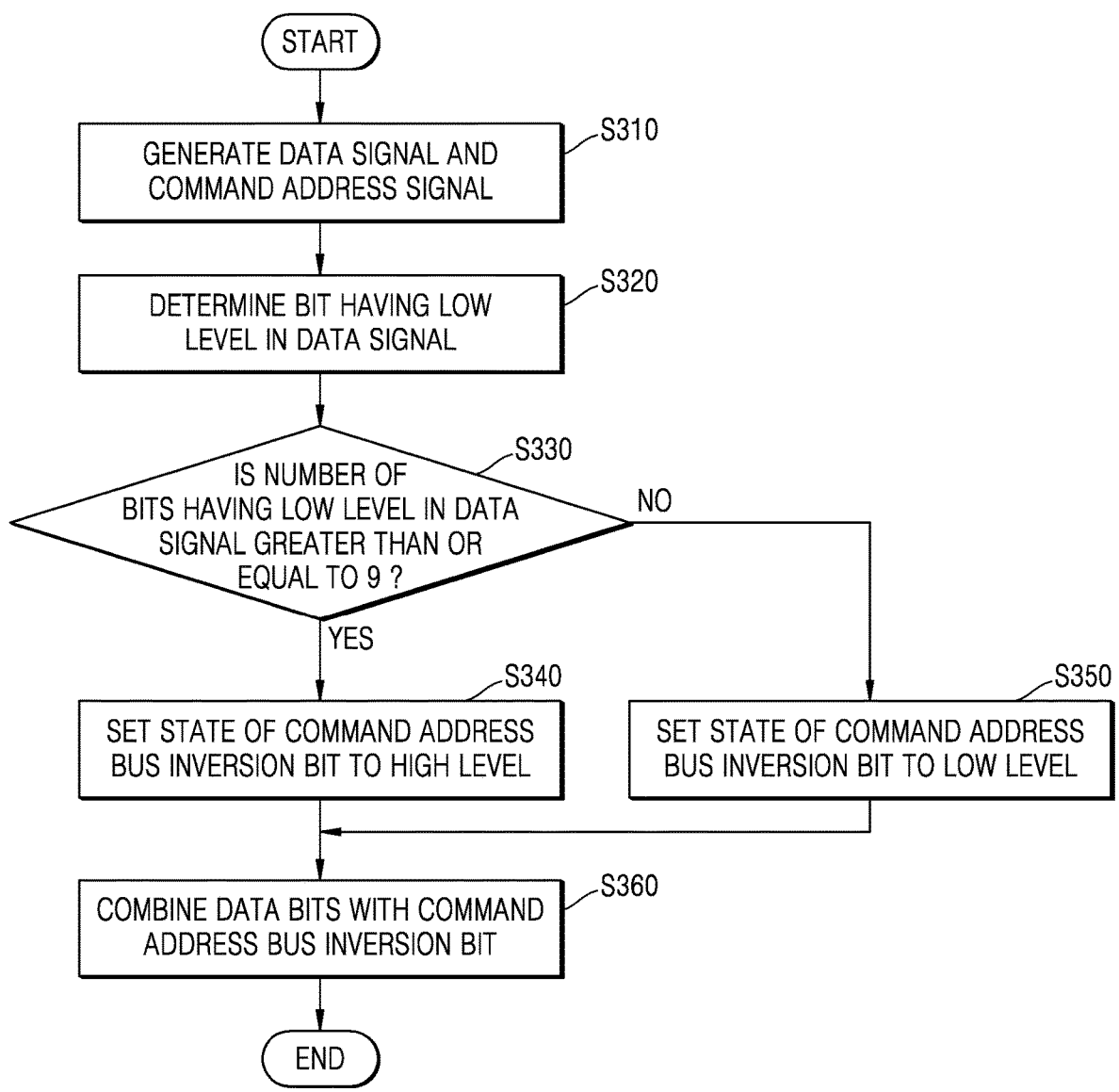
FIG. 6 is a flowchart illustrating a case in which a data signal has 18 bits in an operating method of a memory system, according to an example embodiment of the inventive concept.

FIG. 6 is a flowchart illustrating a case in which a data signal has 18 bits in an operating method of the memory system 10, according to an example embodiment of the inventive concept. Referring to FIG. 6, the operating method of the memory system 10 according to the present embodiment starts from generating the command address signal CA by using the host system 100 (S310) in the same manner as in the method described with reference to FIG. 4.

When the command address signal CA is generated, the memory controller 110 may determine bits having a low logic level among data bits included in the command address signal CA (S320). That is, the memory controller 110 may determine bits having a logical value of "0" among the data bits included in the command address signal CA. And, when the bits having a low logic level among the data bits included in the command address signal CA are determined, the memory controller 110 determines whether the number of bits having a low logic level among bits included in the data bits is greater than or equal to 9 (S330). Here, the total number of bits included in the command address signal CA may be 20, and the total number of data bits included in the command address signal CA may be 18.

When it is determined that the number of bits having a low logic level among the bits included in the data bits is greater than or equal to 9 (YES in S330), the memory controller 110 sets a state of the command address bus inversion bit to a high logic level (S340). When the state of the command address bus inversion bit is set to a high logic level, the number of bits having a low logic level in the command address signal CA may be reduced to 9 or less, and accordingly, power consumed by the memory system 10 may be reduced. However, when it is determined that the number of bits having a low logic level among the bits included in the data bits is less than 9 (NO in S330), the memory controller 110 sets the state of the command address bus inversion bit to a low logic level (S350).

When the state of the command address bus inversion bit is determined, the memory controller 110 may combine the data bit with the command address bus inversion bit (S360). Here, a signal obtained by combining data bits with the command address bus inversion bit may be referred to as a first signal.

Figure 7:
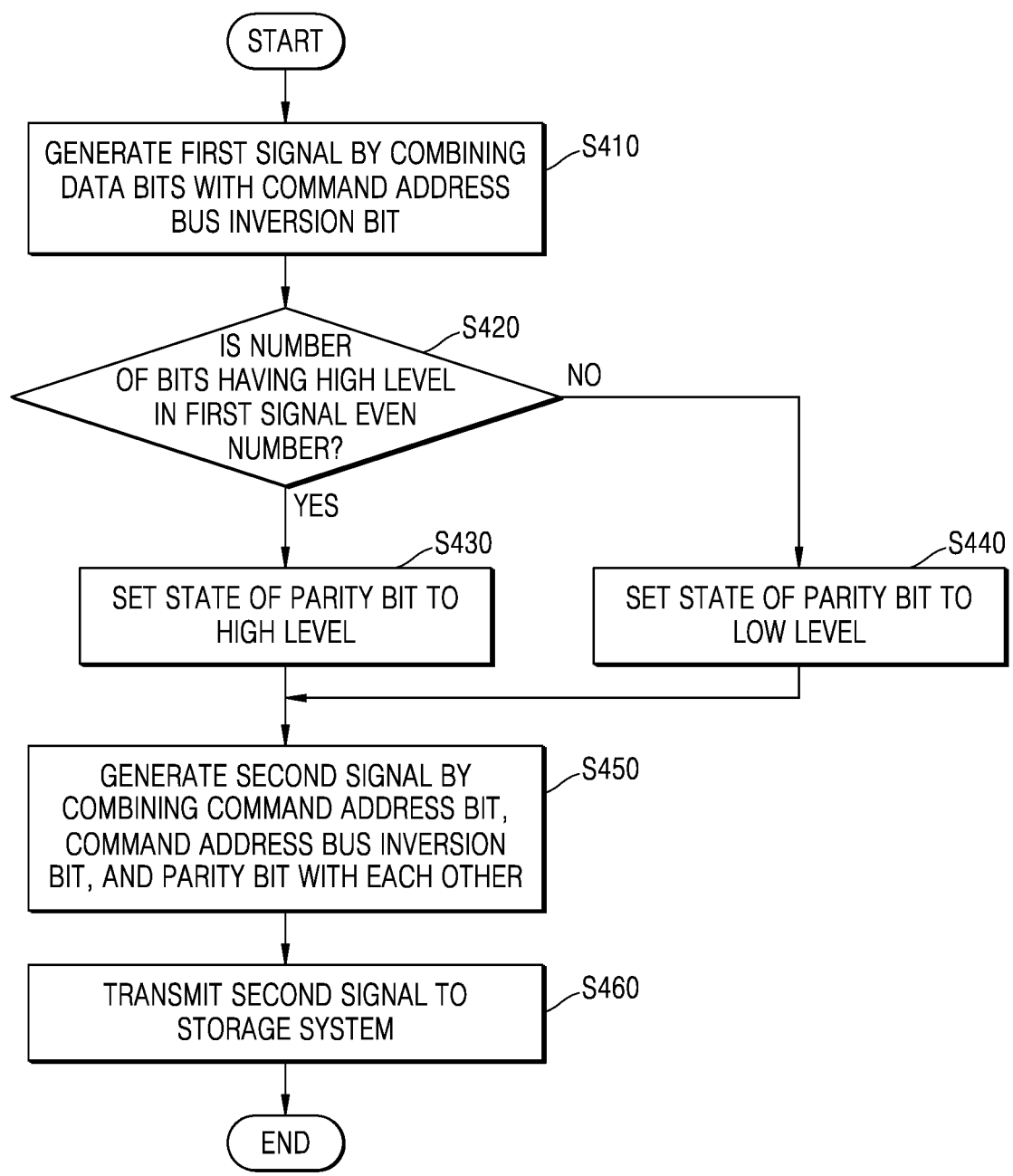
FIG. 7 is a flowchart illustrating a process of determining a parity bit when a data signal has 18 bits in a method of operating a memory system, according to an example embodiment of the inventive concept.

FIG. 7 is a flowchart illustrating a process of determining a parity bit when a data signal has 18 bits in the operating method of the memory system 10, according to an example embodiment of the inventive concept. Referring to FIG. 7, the memory controller 110 may generate a first signal obtained by combining data bits with the command address bus inversion bit (S410). Here, the first signal may be generated through the process of FIG. 6. In addition, the number of bits having a low logic level in the first signal may be less than or equal to 9.

The memory controller 110 may determine whether the number of bits having a high logic level in the first signal is an even number (S420). And, once it is determined that the number of bits having a high logic level in the first signal is an even number (YES in S420), the memory controller 110 sets a state of a parity bit to a high logic level (S430). That is, when it is determined that the number of bits having a high logic level in the first signal is an even number, the memory controller 110 may set a logical value of the parity bit to "1". However, when it is determined that the number of bits having a high logic level in the first signal is not an even number (NO in S420), the memory controller 110 sets the state of the parity bit to a low logic level (S440). That is, when it is determined that the number of bits having a high logic level in the first signal is not an even number, the memory controller 110 may determine a logical value of the parity bit as "0".

When the state of the parity bit is determined, the memory controller 110 generates a second signal obtained by combining a command address bit, the command address bus inversion bit, and the parity bit (S450). Here, the second signal may include the command address signal CA.

When the second signal is generated, the memory controller 110 transmits the second signal to the storage system 200 (S460). The second signal may include a data write command or a data read command with respect to the storage system 200 but is not limited thereto and may include various types of information that may be transferred from a memory system to a storage device by a host system.

Figure 8:
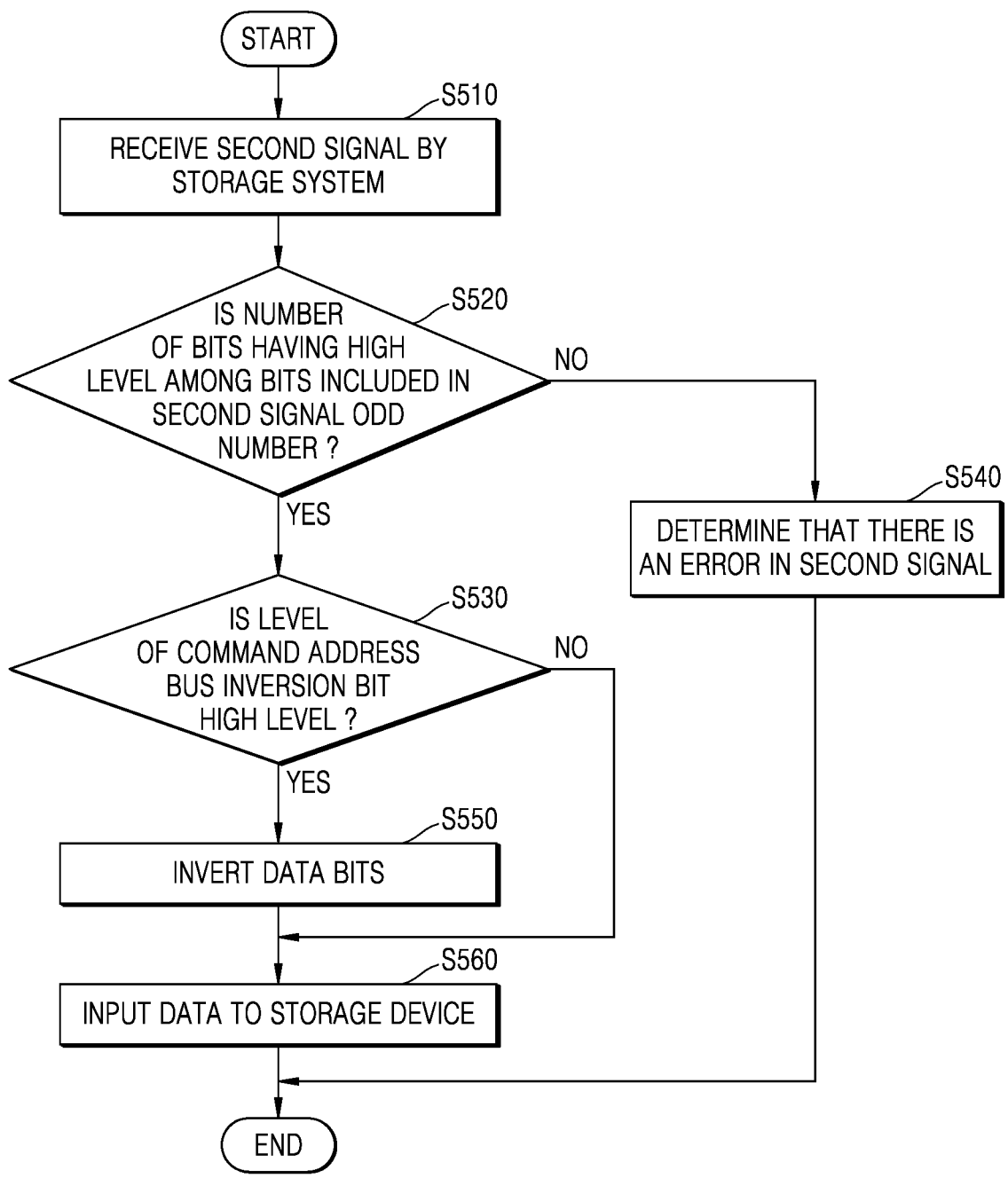
FIG. 8 is a flowchart illustrating a process of receiving a command address signal by a storage system, according to an example embodiment of the inventive concept.

FIG. 8 is a flowchart illustrating a process of receiving the command address signal CA by the storage system 200, according to an example embodiment of the inventive concept. Referring to FIG. 8, the storage system 200 according to the present embodiment receives a second signal (S510). Here, the second signal may include the command address signal CA.

When receiving the second signal, the error detector 220 of the storage system 200 determines whether the number of bits having a high logic level among bits included in the second signal is an odd number (S520). That is, the error detector 220 may determine whether the number of bits having a logical value "1" among the bits included in the second signal is an odd number.

When it is determined that the number of bits included in the second signal having a high logic level is an odd number (YES in S520), the error detector 220 determines whether a command address bus inversion bit included in the command address signal CA has a high logic level (S530). That is, the error detector 220 may determine whether a logical value of the command address bus inversion bit is "1". However, when it is determined that the number of bits included in the second signal having a high logic level is not an odd number (NO in S520), the error detector 220 determines that there is an error in the second signal (S540). When it is determined that there is an error in the second signal, the error detector 220 may not transmit the command address signal CA to the storage device 210.

When it is determined that the number of bits included in the second signal having a high logic level is an odd number and the command address bus inversion bit included in the command address signal CA has a high logic level (YES in S530), the error detector 220 inverts data bits in the command address signal CA (S550).

When the data bits are inverted, data included in the command address signal CA may be input to the storage device 210 (S560). However, when the number of bits included in the second signal having a high logic level is an odd number (YES in S520) and the command address bus inversion bit included in the command address signal CA has a low logic level (NO in S530), the error detector 220 may directly input the data bits in the command address signal CA to the storage device 210 without inverting the data bits.

FIG. 9 illustrates states of a command address signal generated by the memory system 10 according to an example embodiment of the inventive concept. Referring to FIG. 9, a command address bus inversion bit CABIB and a parity bit PAR may have either a low logic level L or a high logic level H. In addition, the data bits may each have either the low logic level L or the high logic level H, and according to the present embodiment, the sum of the number of data bits D0 having a low logic level and the number of data bits D1 having a high logic level may be 18. In addition, the command address signal CA may be generated by combining the data bits D0 and D1, the command address bus inversion bit CABIB, and the parity bit PAR with each other, and the total number "Total # of 0" of bits having a low logic level included in the command address signal CA may be controlled so as not to exceed a threshold. However, the number of data bits is not limited thereto and may be set to differ depending on various embodiments.

According to the present embodiment, when the number of bits having a low logic level among data bits is 0 and the number of bits having a high logic level among the data bits is 18, the command address bus inversion bit CABIB may be set to a low logic level and the parity bit may be set to a high logic level. As a result, the number of bits having a low logic level in the command address signal CA may be set to 1.

In addition, when one of the data bits has a low logic level and 17 of the data bits have a high logic level, the command address bus inversion bit CABIB may be set to a low logic level and the parity bit may be set to a low logic level. As a result, the number of bits having a low logic level in the command address signal CA may be set to 3. And, when two bits of the data bits have a low logic level and 16 bits of the data bits have a high logic level, the command address bus inversion bit CABIB may be set to a low logic level and the parity bit may be set to a high logic level. As a result, the number of bits having a low logic level in the command address signal CA may be set to 3.

Furthermore, when three bits of the data bits have a low logic level and 15 bits of the data bits have a high logic level, the command address bus inversion bit CABIB may be set to a low logic level and the parity bit may be set to a low logic level. As a result, the number of bits having a low logic level in the command address signal CA may be set to 5. And, when four bits of the data bits have a low logic level and 14 bits of the data bits have a high logic level, the command address bus inversion bit CABIB may be set to a low logic level and the parity bit may be set to a high logic level. As a result, the number of bits having a low logic level in the command address signal CA may be set to 5. When five bits of the data bits have a low logic level and 13 bits of the data bits have a high logic level, the command address bus inversion bit CABIB may be set to a low logic level and the parity bit may be set to a low logic level. As a result, the number of bits having a low logic level in the command address signal CA may be set to 7. And, when six bits of the data bits have a low logic level and 12 bits of the data bits have a high logic level, the command address bus inversion bit CABIB may be set to a low logic level and the parity bit may be set to a high logic level. As a result, the number of bits having a low logic level in the command address signal CA may be set to 7. When seven bits of the data bits have a low logic level and 11 bits of the data bits have a high logic level, the command address bus inversion bit CABIB may be set to a low logic level and the parity bit may be set to a low logic level. As a result, the number of bits having a low logic level in the command address signal CA may be set to 9. When, eight bits of the data bits have a low logic level and ten bits of the data bits have a high logic level, the command address bus inversion bit CABIB may be set to a low logic level and the parity bit may be set to a high logic level. As a result, the number of bits having a low logic level in the command address signal CA may be set to 9.

Next, when nine bits of the data bits have a low logic level and nine bits of the data bits have a high logic level, the command address bus inversion bit CABIB may be set to a high logic level and the parity bit may be set to a high logic level. As a result, the number of bits having a low logic level in the command address signal CA may be set to 9. Next, when eight bits of the data bits have a low logic level and ten bits of the data bits have a high logic level, the command address bus inversion bit CABIB may be set to a high logic level and the parity bit may be set to a low logic level. As a result, the number of bits having a low logic level in the command address signal CA may be set to 9. Next, when seven bits of the data bits have a low logic level and 11 bits of the data bits have a high logic level, the command address bus inversion bit CABIB may be set to a high logic level and the parity bit may be set to a high logic level. As a result, the number of bits having a low logic level in the command address signal CA may be set to 7. Furthermore, when six bits of the data bits have a low logic level and 12 bits of the data bits have a high logic level, the command address bus inversion bit CABIB may be set to a high logic level and the parity bit may be set to a low logic level. As a result, the number of bits having a low logic level in the command address signal CA may be set to 7.

Also, when five bits of the data bits have a low logic level and 13 bits of the data bits have a high logic level, the command address bus inversion bit CABIB may be set to a high logic level and the parity bit may be set to a high logic level. As a result, the number of bits having a low logic level in the command address signal CA may be set to 5. And, when four bits of the data bits have a low logic level and 14 bits of the data bits have a high logic level, the command address bus inversion bit CABIB may be set to a high logic level and the parity bit may be set to a low logic level. As a result, the number of bits having a low logic level in the command address signal CA may be set to 5. When three bits of the data bits have a low logic level and 15 bits of the data bits have a high logic level, the command address bus inversion bit CABIB may be set to a high logic level and the parity bit may be set to a high logic level. As a result, the number of bits having a low logic level in the command address signal CA may be set to 3. When, two bits of the data bits have a low logic level and 16 bits of the data bits have a high logic level, the command address bus inversion bit CABIB may be set to a high logic level and the parity bit may be set to a low logic level. As a result, the number of bits having a low logic level in the command address signal CA may be set to 3.

Next, when one bit of the data bits has a low logic level and 17 bits of the data bits have a high logic level, the command address bus inversion bit CABIB may be set to a high logic level and the parity bit may be set to a high logic level. As a result, the number of bits having a low logic level in the command address signal CA may be set to 1. Finally, when the number of bits having a low logic level among the data bits is 0 and the number of bits having a high logic level among the data bits is 18, the command address bus inversion bit CABIB may be set to a high logic level and the parity bit may be set to a low logic level. As a result, the number of bits having a low logic level in the command address signal CA may be set to 1.

When the number of bits included in the command address signal CA according to the present embodiment is 20 and the number of data bits is 18, and when a state of the command address bus inversion bit and a state of the parity bit are set based on the number of bits having a low logic level included in the data bits, the number of bits having a low logic level among the bits included in the command address signal CA may be maintained as 9 or less. That is, the memory system 10 according to the present embodiment may limit the number of bits having a low logic level to a maximum of (n/2)−1 when generating the command address signal CA, and thus, power consumed by the memory system 10 may be reduced. Here, the number of bits included in the command address signal CA is not limited to 20, and the number of data bits is also not limited to 18.

Figure 10:
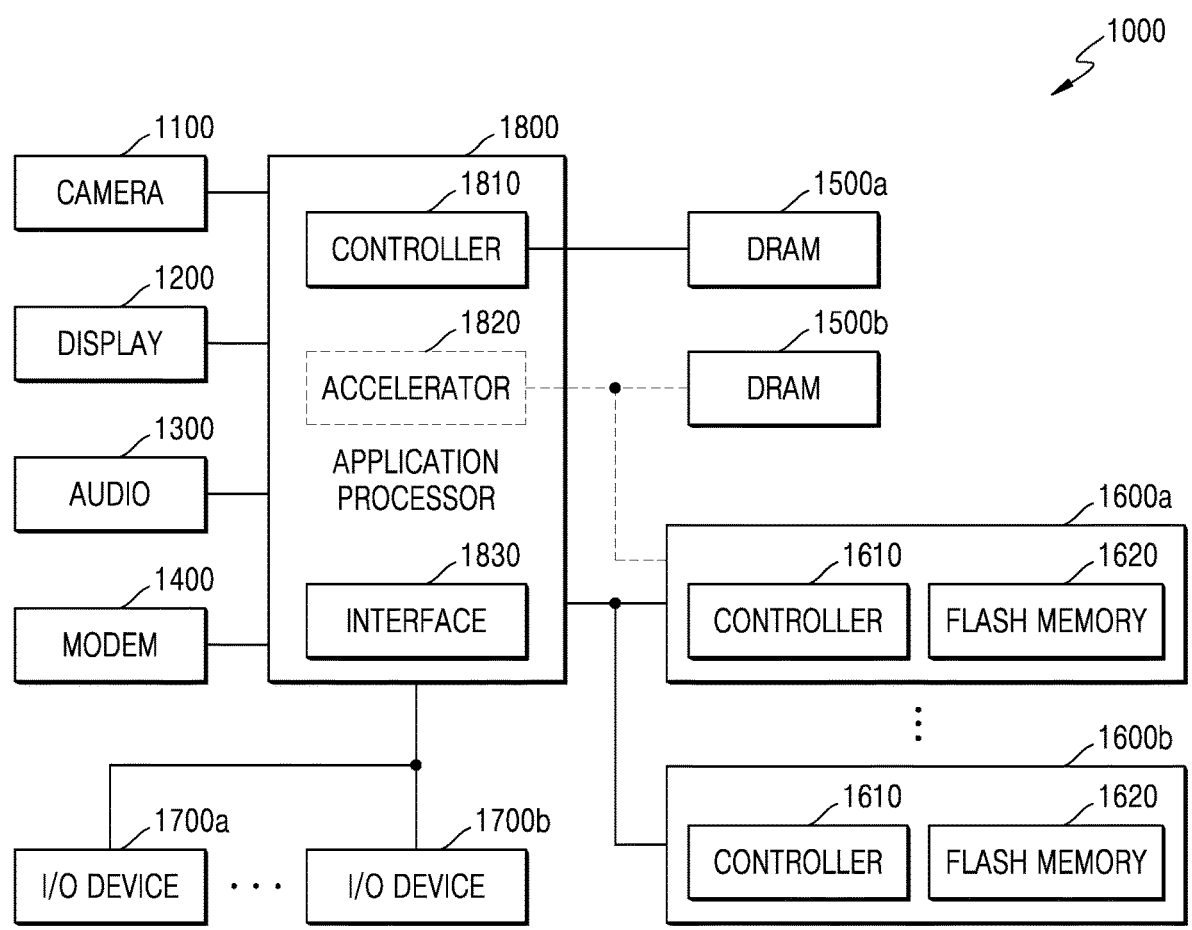
FIGS. 10 to 12 illustrate examples in which a memory system that may be implemented according to an example embodiment of the inventive concept is utilized in various devices.
Figure 11:
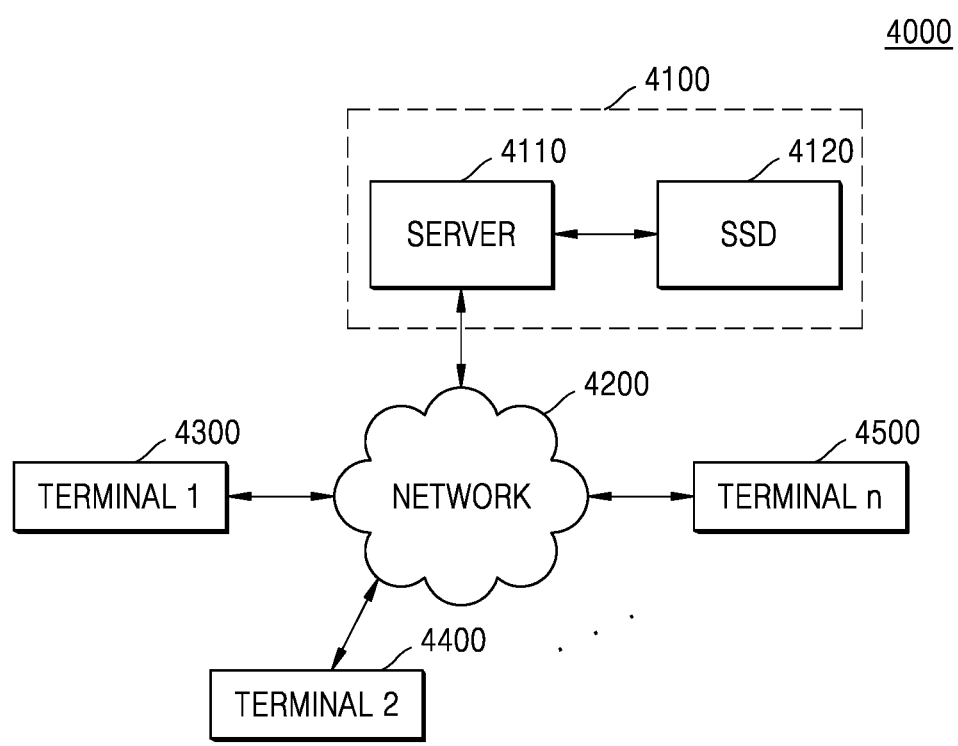
Figure 12:
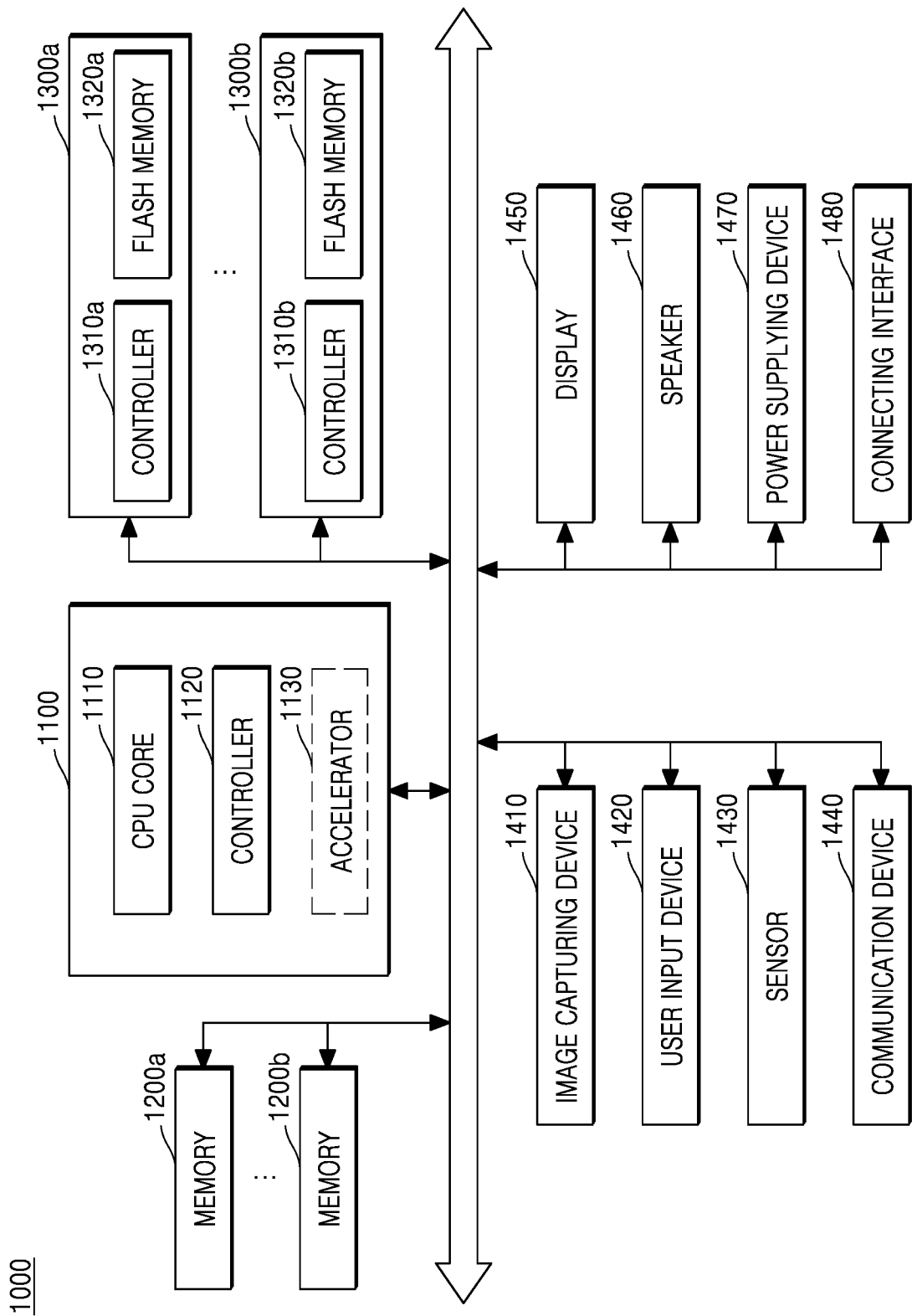

FIGS. 10 to 12 illustrate examples in which a memory system that may be implemented according to an example embodiment of the inventive concept is utilized in various devices. FIG. 10 is a block diagram illustrating a system 1000 to which a memory device according to example embodiments is applied. Referring to FIG. 10, the system 1000 may include a camera 1100, a display 1200, an audio processor 1300, a modem 1400, DRAMs 1500a and 1500b, flash memories 1600a and 1600b, I/O devices 1700a and 1700b, and an application processor (hereinafter, referred to as "AP") 1800. The system 1000 may include a laptop computer, a mobile phone, a smartphone, a tablet personal computer (PC), a wearable device, a healthcare device, or an Internet of things (IoT) device. In addition, the system 1000 may include a server or a PC.

The camera 1100 may capture a still image or a moving image under control by a user and may store the captured image and image data or transmit the captured image and image data to the display 1200. The audio processor 1300 may process audio data included in the flash memory devices 1600a and 1600b or content of a network. The modem 1400 may modulate and transmit a signal for transmission or reception of wired or wireless data, and may demodulate the wired or wireless data to restore an original signal therefrom at a reception portion. The I/O devices 1700a and 1700b may include devices that provide a digital input and/or an output function, such as a USB storage, a digital camera, a secure digital (SD) card, a digital versatile disk (DVD), a network adapter, and a touch screen.

The AP 1800 may control all operations of the system 1000. The AP 1800 may control the display 1200 to display some of contents stored in the flash memory devices 1600a and 1600b on the display 1200. When a user input is received through the I/O devices 1700a and 1700b, the AP 1800 may perform a control operation corresponding to the user input. The AP 1800 may include an accelerator block, which is a dedicated circuit for artificial intelligence (AI) data calculation, or may include an accelerator chip 1820 independently of the AP 1800. The DRAM 1500b may be additionally mounted in the accelerator block or the accelerator chip 1820. An accelerator is a functional block that specializes in performing certain functions of the AP 1800 and may include a graphics processing unit (GPU) which is a functional block specialized in processing graphics data, a neural processing unit (NPU) which is a block specialized in AI calculation and inference, and a data processing unit (DPU) which is a block specialized in data transmission.

The system 1000 may include a plurality of DRAMs 1500a and 1500b. The AP 1800 may control the DRAMs 1500a and 1500b through a command and a mode register set (MRS) conforming to joint electron device engineering council (JEDEC) standards or perform communication by setting a DRAM interface rule to use company-specific functions, such as a low voltage, a high speed, and reliability, and cyclic redundancy check (CRC)/error correction code (ECC) functions. For example, the AP 1800 may communicate with the DRAM 1500a through an interface conforming to JEDEC standards, such as LPDDR4 and LPDDR5, and an accelerator block or the accelerator chip 1820 may perform communication by setting a new DRAM interface protocol to control the DRAM 1500b for an accelerator having a higher bandwidth than the DRAM 1500a.

FIG. 10 illustrates only the DRAMs 1500a and 1500b but is not limited thereto, and any memory device, such as PRAM, static RAM (SRAM), MRAM, RRAM, FRAM, or Hybrid RAM may be used as long as a bandwidth, a response speed, and a voltage condition of the AP 1800 or the accelerator chip 1820 are satisfied. The DRAMs 1500a and 1500b may have relatively smaller latency and bandwidth than latency and bandwidth of the I/O devices 1700a and 1700b or the flash memories 1600a and 1600b. The DRAMs 1500a and 1500b may be initialized when the system 1000 is powered on, and may be used as temporary storage locations for an operating system and application data when the operating system and the application data are loaded therein, or may be used as execution spaces for various software codes.

The DRAMs 1500a and 1500b may perform calculations of addition, subtraction, multiplication, and division, vector operations, address operations, or fast Fourier transform (FFT) operations. In addition, the DRAMs 1500a and 1500b may perform a function for inference. Here, the inference may be performed by a deep learning algorithm using an artificial neural network. The deep learning algorithm may include a training step of learning a model through various pieces of data and an inference step of recognizing data with the learned model. In one example, an image captured by a user through the camera 1100 is signal-processed and stored in the DRAM 1500b, and an accelerator block or the accelerator chip 1820 may perform an AI data operation that recognizes data by using the data stored in the DRAM 1500b and a function to be used in inference.

The system 1000 may include a plurality of storages each having a larger capacity than capacities of the DRAMs 1500a and 1500b, or a plurality of flash memories 1600a and 1600b. An accelerator block or the accelerator chip 1820 may perform a training step and AI data operation by using the flash memories 1600a and 1600b. In one example, the flash memories 1600a and 1600b may more efficiently perform the training step and inference AI data operation performed by the AP 1800 and/or the accelerator chip 1820 by using an arithmetic unit included in a memory controller 1610. The flash memories 1600a and 1600b may store photos taken by the camera 1100 or data transmitted through a data network. For example, the flash memories 1600a and 1600b may store augmented reality/virtual reality, and high definition (HD) or ultrahigh definition (UHD) content.

FIG. 11 is a block diagram illustrating a network system when a memory system according to an embodiment of the inventive concept is implemented as a server system. Referring to FIG. 11, a network system 4000 may include a server system 4100 and a plurality of terminals 4300, 4400, 4500, . . . that communicate with each other through a network 4200. The server system 4100 may include a server 4110 and a solid state drive (SSD) 4120 that is a storage system. The server 4110 may perform a function of the host system in the embodiment described above.

The server 4110 may process requests transmitted from the plurality of terminals 4300, 4400, 4500, . . . connected to the network 4200. In one example, the server 4110 may store data provided from the plurality of terminals 4300, 4400, 4500, ... in the SSD 4120. In addition, in storing data in the SSD 4120, the data may be stored in the SSD 4120 for management of the SSD 4120, and according to the embodiments described above, the server 4110 may request allocation of a block for data storing to the SSD 4120, allocate blocks in which the SSD 4120 stores data, and perform a bad block determination and a management operation for the allocated blocks, and error recovery technology may be applied thereto to improve data reliability.

FIG. 12 is a diagram illustrating an application example of a memory system according to an example embodiment of the inventive concept. Referring to FIG. 12, a system 1000 of FIG. 12 may be basically a mobile system, such as a mobile phone, a smartphone, a tablet PC, a wearable device, a healthcare device, or an IoT device. However, the system 1000 of FIG. 12 is not limited to a mobile system and may be automotive device or so on, such as a personal computer, a laptop computer, a server, a media player, or a navigation. As shown, the system 1000 may include a main processor 1100, memories 1200a and 1200b, and storage devices 1300a and 1300b, and additionally include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, and more specifically, operations of other components included in the system 1000. The main processor 1100 may be implemented as a general-purpose processor, a dedicated processor, or an AP. The main processor 1100 may include one or more CPU cores 1110 and may further include a controller 1120 for controlling the memories 1200a and 1200b and/or the storage devices 1300a and 1300b. Depending on embodiments, the main processor 1100 may further include an accelerator block 1130 that is a dedicated circuit for a high-speed data operation, such as an AI data operation. The accelerator block 1130 may include a GPU, an NPU, a DPU, and/or so on and may be implemented as a separate chip physically independent of other components of the main processor 1100.

The memories 1200a and 1200b may be used as main memory devices of the system 1000 and may each include a volatile memory, such as SRAM and/or DRAM, but may also include non-volatile memories, such as flash memories, PRAMs, and/or RRAMs. The memories 1200a and 1200b may also be included in the same package as the main processor 1100.

The storage devices 1300a and 1300b may function as non-volatile storage devices that store data regardless of whether power is supplied and may have a relatively large storage capacity compared to the memories 1200a and 1200b. The storage devices 1300a and 1300b may respectively include storage controllers 1310a and 1310b and non-volatile memories (NVMs) 1320a and 1320b that store data under control by the storage controllers 1310a and 1310b. The non-volatile memories 1320a and 1320b may include NAND flash memories but may also include other types of non-volatile memories, such as PRAMs and/or RRAMs.

The storage devices 1300a and 1300b may also be included in the system 1000 by being physically separated from the main processor 1100 or may also be included in the same package as the main processor 1100. In addition, each of the storage devices 1300a and 1300b may also be detachably coupled to another component of the system 1000 through an interface, such as the connecting interface 1480 to be described below by having a shape, such as a memory card. The storage devices 1300a and 1300b may be devices to which a standard protocol, such as a universal flash storage (UFS) protocol, is applied. For example, the storage devices 1300a and 1300b may correspond to UFS cards.

The image capturing device 1410 may capture a still image or a moving image and may include a camera, a camcorder, and/or a webcam. The user input device 1420 may receive various types of data input from a user of the system 1000 and may include a touch pad, a keypad, a keyboard, a mouse, a microphone and/or so on. The sensor 1430 may detect various types of physical quantities that may be acquired from the outside of the system 1000 and convert the detected physical quantities into electrical signals. The sensor 1430 may include a temperature sensor, a pressure sensor, an illuminance sensor, a position sensor, an acceleration sensor, a biosensor, a gyroscope, and/or so on. The communication device 1440 may transmit and receive signals to and from other devices outside the system 1000 according to various communication protocols. The communication device 1440 may include an antenna, a transceiver, a modem, and/or so on. The display 1450 and the speaker 1460 may function as output devices that respectively output visual information and auditory information to a user of the system 1000. The power supplying device 1470 may appropriately convert power supplied from a battery (not illustrated) included in the system 1000 and/or an external power supply to supply the power to components of the system 1000. The connecting interface 1480 may provide a connection between the system 1000 and an external device connected to the system 1000 to exchange data with the system 1000. The connecting interface 1480 may be implemented in various interface types, such as ATA, SATA, external SATA (e-SATA), small computer small interface (SCSI), serial attached SCSI (SAS), peripheral component interconnection (PCI), PCIe, NVM express (NVMe), IEEE 1394, Universal Serial Bus (USB), a secure digital (SD) card, a multi-media card (MMC), an embedded multi-media card (eMMC), a universal flash storage (UFS), an embedded universal flash storage (eUFS), and a compact flash (CF) card.

While the inventive concept has been particularly shown and described with reference to embodiments thereof, it will be understood that various changes in form and details may be made therein without departing from the spirit and scope of the following claims. Therefore, the present embodiments are not intended to limit the technical idea described in the present specification, and the scope of the technical idea of the inventive concept is not limited by the present embodiments. The scope of protection of the inventive concept according to the present embodiments should be construed according to the following claims, and all technical ideas within the equivalent range should be construed as being included in the scope of the inventive concept.

What is claimed is:
1. A memory system, comprising:
a host system including a memory controller configured to generate a command address signal, said memory controller comprising:
a first bit signal generator configured to generate a data signal as a plurality of data bits;
a second bit signal generator configured to generate a command address bus inversion bit (CABIB) having a high or low logic level that is a function of a number of data bits within the data signal having a predetermined logic level; and a parity bit generator configured to set a parity signal to a first logic level when a total number of data bits within the data signal and the CABIB having a high logic level is an even number; and a storage system configured to write or read data in response to the command address signal received from the host system.

2. The system of claim 1, wherein the memory controller is configured to set the CABIB to a high logic level when: (i) "n", which is a number of bits included in the command address signal, is a positive integer greater than one, and (ii) a number of data bits within the data signal having a low logic level is greater than or equal to (n/2)−1.

3. The system of claim 1, wherein the memory controller is configured to set a level of the parity signal to a low logic level when the number of data bits within the data signal and the CABIB having a high logic level is an odd number.

4. The system of claim 1, wherein the memory controller is configured to set a level of the parity signal to a high logic level when the number of data bits within the data signal and the CABIB having a high logic level is an even number.

5. The system of claim 1, wherein the storage system includes an error detector configured to detect an error within the command address signal; and wherein the error detector is configured to determine that there is no error in the command address signal when a number of signals having the high logic level within the command address signal is an odd number.

6. The system of claim 5, wherein the error detector is configured to invert the data bits within the data signal when a level of the CABIB is a high logic level.

7. The system of claim 1, wherein, when the number of data bits within the data signal is 18, the memory controller sets a level of the CABIB to the low logic level when the number of data bits within the data signal having the low logic level is greater than or equal to 9.

8. The system of claim 7, wherein the memory controller is configured to maintain levels of the plurality of data bits.

9. The system of claim 1, wherein, when the number of data bits within the data signal is 18, the memory controller sets a level of the CABIB to the high logic level when the number of data bits within the data signal having the low logic level is less than 9.

10. The system of claim 9, wherein the memory controller is configured to invert levels of the plurality of data bits.

11. A method of operating a memory system, comprising:
generating, by a memory controller, a command address signal to be transmitted to a memory device; and
writing or reading data to or from a storage device within a storage system based on the command address signal, which is received by the storage system;
wherein said generating comprises:
generating a data signal including a plurality of data bits;
generating a command address bus inversion bit (CABIB) having one of a high logic level and a low logic level based on a number of data bits within the data signal having a low logic level; and
generating a parity bit to a high logic level when a sum of: (i) a total number of data bits having the high logic level within the data signal, and (ii) the CABIB, is an even number.

12. The method of claim 11, wherein the CABIB is set to a high logic level when: (i) "n", which is a number of bits included in the command address signal, is a positive integer greater than one, and (ii) a number of data bits having a low logic level within the data signal is greater than or equal to (n/2)−1.

13. The method of claim 11, wherein said generating includes setting the parity bit to a low logic level when a sum of: (i) the number of data bits within the data signal having a high logic level, and (ii) the CABIB, is an odd number.

14. The method of claim 11, wherein said generating includes setting the parity bit to a high logic level when a sum of: (i) the number of data bits within the data signal having a high logic level, and (ii) the CABIB, is an even number.

15. The method of claim 11, wherein during said generating, if the number of data bits within the data signal is 18, a level of the CABIB is set to a low logic level when the number of data bits having the low logic level is greater than or equal to 9.

16. The method of claim 15, wherein levels of the plurality of data bits are maintained during said generating of the command address signal.

17. The method of claim 11, wherein during said generating, if the number of data bits within the data signal is 18, a level of the CABIB is set to the high logic level when the number of data bits having low logic level is less than 9.

18. The method of claim 17, wherein the memory controller inverts levels of the plurality of data bits.

19. A memory controller, which controls an operation of a host system for generating a command address, comprising:
a first bit signal generator configured to generate a data signal including a plurality of data bits;
a second bit signal generator configured to generate a command address bus inversion bit (CABIB) having one of a high logic level and a low logic level based on a number of signals having the low logic level included in the plurality of data bits; and
a parity bit generator configured to set a parity signal to a high logic level when a number of signals having a high logic level among signals included in the plurality of data bits and the command address bus inversion bit is an even number.

20. The memory controller of claim 19, wherein, when n is a number of bits included in the command address signal having a natural number greater than or equal to 2 and a number of bits having a low logic level included in the plurality of data bits is greater than or equal to (n/2)−1, and the number of signals having the high logic level among the signals included in the plurality of data bits and the CABIB is an odd number, the memory controller sets the CABIB to a high logic level and sets a level of a parity signal to a low logic level.

* * * * *